(12) United States Patent
Wilhelm et al.

(10) Patent No.: US 11,280,754 B2
(45) Date of Patent: Mar. 22, 2022

(54) MEASURING PROBE FOR ELECTROCHEMICAL MEASUREMENTS

(71) Applicant: Endress+Hauser Conducta GmbH+Co. KG, Gerlingen (DE)

(72) Inventors: Thomas Wilhelm, Chemnitz (DE); Torsten Pechstein, Radebeul (DE)

(73) Assignee: ENDRESS+HAUSER CONDUCTA GMBH+CO. KG, Gerlingen (DE)

(*) Notice: Subject to any disclaimer, the term of this patent is extended or adjusted under 35 U.S.C. 154(b) by 136 days.

(21) Appl. No.: 16/214,660

(22) Filed: Dec. 10, 2018

(65) Prior Publication Data

US 2019/0178830 A1 Jun. 13, 2019

(30) Foreign Application Priority Data

Dec. 12, 2017 (DE) ...................... 10 2017 129 635.2

(51) Int. Cl.
*G01N 27/30* (2006.01)
*G01N 27/36* (2006.01)
(Continued)

(52) U.S. Cl.
CPC ......... *G01N 27/301* (2013.01); *G01N 27/333* (2013.01); *G01N 27/36* (2013.01);
(Continued)

(58) Field of Classification Search
None
See application file for complete search history.

(56) References Cited

U.S. PATENT DOCUMENTS 4,686,011 A * 8/1987 Jackle ................ G01N 27/4035
204/401
2006/0070889 A1* 4/2006 Ehrismann ........... G01N 27/301
205/775
(Continued)

FOREIGN PATENT DOCUMENTS

CN 102565157 A 7/2012
CN 102565165 A 7/2012
(Continued)

OTHER PUBLICATIONS

Machine translation of EP-1219958-A1, Buehler Hannes Dr. (Year: 2002).*

*Primary Examiner* — Mayla Gonzalez Ramos
(74) *Attorney, Agent, or Firm* — Christopher R. Powers; Endress+Hauser(USA) Holding, Inc.

(57) ABSTRACT

The present disclosure relates to a measuring probe for electrochemical measurements, including a probe housing having a first cavity to hold a first electrolyte, a first electrode disposed in the first cavity and contacting the first electrolyte, a first junction disposed in a wall of the probe housing, the junction at least temporarily connecting the first cavity with an environment of the measuring probe, a second cavity formed in the probe housing to hold a second electrolyte, a second electrode disposed in the second cavity and contacting the second electrolyte, and a second junction having reversible open and closed states, in which in the closed state the second junction separates the first cavity and the second cavity and in the open state connects the second cavity to the first cavity, thereby enabling a current flow between the first electrolyte and the second electrolyte, mediated via ions as charge carriers therebetween.

21 Claims, 2 Drawing Sheets

(51) Int. Cl.
*G01N 27/333* (2006.01)
*G01N 27/414* (2006.01)
*G01N 27/416* (2006.01)

(52) U.S. Cl.
CPC ..... *G01N 27/4148* (2013.01); *G01N 27/4163* (2013.01); *G01N 27/4167* (2013.01)

(56) References Cited

U.S. PATENT DOCUMENTS

2013/0113459 A1* 5/2013 Gahr .................. G01N 33/18
324/76.11
2013/0161191 A1* 6/2013 Wilhelm .............. G01N 27/301
204/406

FOREIGN PATENT DOCUMENTS

| | | |
|---|---|---|
| CN | 102590532 A | 7/2012 |
| CN | 103091375 A | 5/2013 |
| CN | 103175878 A | 6/2013 |
| DE | 102011086591 A1 | 7/2012 |
| EP | 1176419 A2 | 1/2002 |
| EP | 1219958 A1 * | 7/2002 ......... G01N 27/4165 |

* cited by examiner

MEASURING PROBE FOR ELECTROCHEMICAL MEASUREMENTS

CROSS-REFERENCE TO RELATED APPLICATION

The present application is related to and claims the priority benefit of German Patent Application No. 10 2017 129 635.2, filed on Dec. 12, 2017, the entire contents of which are incorporated herein by reference.

TECHNICAL FIELD

The present disclosure relates to a measuring probe for electrochemical measurements, an electrochemical sensor, and a method for operating the electrochemical sensor.

BACKGROUND

Electrochemical sensors are used for the analysis of measurement media, especially measurement fluids, in laboratory and process measurement technology in many fields of chemistry, biochemistry, pharmacy, biotechnology, food technology, water management, and environmental metrology. Electrochemical measuring techniques allow detection of, e.g., concentrations or activities of chemical substances, for example, ions, and of measurement variables correlated therewith in liquids. The substance whose concentration or activity is to be measured is also referred to as an analyte. Generic electrochemical measuring arrangements may be, e.g., potentiometric or amperometric sensors.

Potentiometric sensors typically comprise a measuring electrode and a reference electrode, as well as a sensor circuit. In contact with the measurement medium, e.g. a measurement fluid, the measuring electrode develops a potential that is a function of the concentration or activity of the analyte in the measurement medium, whereas the reference electrode provides a stable reference potential independent of the analyte concentration. The measurement circuit generates a measuring signal that represents the potential difference between the measuring electrode and the reference electrode. The measurement signal is further processed by the sensor circuit, and/or is optionally output to a superordinate unit connected to the sensor circuit, e.g. a measuring transducer, an operating device, or a process control unit.

The measuring electrode of potentiometric sensors comprises a potential-forming element which may comprise, e.g., a redox electrode, an analyte-sensitive coating, or an ion-selective membrane, depending on the nature of the potentiometric sensor. Examples of potential-forming elements with ion-selective membrane are ion-selective electrodes (ISE). An ISE has a housing, enclosed by an ion-selective membrane, in which is accommodated an inner electrolyte, as well as a discharge electrode which is in contact with the inner electrolyte. If the measurement medium is in contact with the potential-forming element, a relative change in the equilibrium voltage between the measurement medium and the discharge electrode in contact with the potential-forming element via the inner electrolyte is produced via a change in the activity or concentration of the analyte in the measurement medium. The discharge electrode is electrically conductively connected to the sensor circuit. A special case of such an ion-selective electrode is the known pH glass electrode, which has a chamber, enclosed by a pH-sensitive glass membrane, with an inner electrolyte contained therein that comprises a buffer system for setting a stable pH value.

The reference electrode of potentiometric sensors is often designed as an electrode of the second type, whose potential only indirectly depends upon the composition of the measurement medium, in particular not on the concentration of the analyte in the measurement medium. Electrodes of the second type generally comprise an electrode which is in contact with a reference electrolyte. The electrode may be made of a metal, wherein at least a part of the surface of the electrode has a coating consisting of a poorly soluble salt of the metal. The reference electrolyte is generally a saturated solution of this poorly soluble salt. In addition, the reference electrolyte contains a high concentration of the anion of the poorly soluble salt, generally in the form of an alkali salt. The potential of an electrode of the second type depends upon the concentration of the cation of the poorly soluble salt in the reference electrolyte. Due to the very high anion concentration in the reference electrolyte, the concentration of the cation of the poorly soluble salt, and thus the potential of the reference electrode, remains essentially constant. An example of such an electrode of the second type is the known silver/silver chloride reference electrode, widely used in electrochemical sensors, in which the electrode is formed from a silver conductor coated with silver chloride, and the reference electrolyte has a high chloride concentration. The reference electrolyte must be in electrolytic contact with the measurement medium in order to perform a potentiometric measurement. This contact is established by a junction which may consist of, e.g., a hole that passes through the entire housing wall, a porous diaphragm, or a gap. The electrode is electrically conductively connected to the aforementioned sensor circuit. The reference electrolyte may be thickened by adding a thickening agent, in particular a polymer.

Amperometric or voltammetric sensors may, for example, comprise a three-electrode circuit with a working electrode, a counter-electrode, and a reference electrode. Such a sensor may have, e.g., a control circuit, in particular a potentiostatic control circuit, which is designed to provide a nominal voltage between the working electrode and the reference electrode, and to detect the current thereby flowing between the working electrode and the counter-electrode as a measurement signal. The reference electrode, which here is not carrying current, may be designed in the same way as a reference electrode of a potentiometric measuring arrangement.

The reference electrode represents a main source of measurement uncertainties or measurement errors of such electrochemical sensors. The need for electrolytic contact between the reference electrolyte and the measurement medium via the junction thereby plays an essential role. Ions of the reference electrolyte arrive into the measurement medium via the junction. For example, the chloride concentration in the reference electrolyte of a silver/silver chloride reference electrode may decrease more and more over the operating life of the reference electrode, this being referred to as depletion of the reference electrolyte. The depletion leads to drift of the reference potential. This in turn results in a drift of the measurement signal of the electrochemical sensor comprising the reference electrode. A further source of error during operation of conventional reference electrodes is that, over time, the junction becomes clogged by impurities from the measurement medium or by precipitating, poorly soluble salts, which has the consequence that the diffusion potential forming at the junction changes over the course of the operating life of the sensor. This may also lead to drift of the reference potential, or correspondingly to a sensor drift.

The drift of the reference potential may be compensated for by a regular calibration and adjustment of the sensor. Calibration usually refers to the detection of a discrepancy between the measured value measured by the sensor and the actual, correct measured value. Adjustment usually refers to the correction of the measured value measured by the sensor to the actual, correct measured value. Only when the depletion or the drift has progressed to such an extent that a compensation via calibration and/or adjustment is no longer possible is it necessary for the sensor to be taken out of operation. The calibration or adjustment usually takes place at regular time intervals which, depending on the field of use of the sensor, may be between one or a few days and several weeks.

However, the calibration or adjustment requires a substantial installation and/or maintenance expenditure, and is therefore undesirable. In the prior art, there are approaches to avoiding too-frequent preventative maintenance, in that a point in time at which a recalibration or readjustment is actually necessary is determined by means of monitoring the state of an electrochemical sensor. EP 1 176 419 A2 describes an electrochemical measuring probe with a reference electrode which has: a reference electrolyte which is thickened by a polymer and can be brought into contact with a measurement medium via an opening serving as a junction; and two reference elements, namely a primary and a secondary reference element. To detect measured potentiometric values, the reference potential of the reference electrode is tapped at the primary reference element. The secondary reference element is arranged such that depletion of the reference electrolyte, proceeding from the opening to the primary reference element, reaches the secondary reference element in front of the primary reference element. Since, due to the longitudinally displaced arrangement of the two reference elements with respect to the junction, a time delay exists from the point in time of a potential change at the secondary reference element, caused by the electrolyte depletion, until an undesired potential change occurs at the primary reference element, the occurrence of a change in the potential difference between the two reference elements may be used as an advance warning of the unwanted potential change at the primary reference element.

The two reference elements in turn each has its own electrolyte in electrolytic contact with the reference electrolyte via a junction, which electrolyte is contacted by a metallic electrode. To monitor the ageing state of the measuring probe, the potential difference between the two reference elements is continuously detected and is monitored for an overrun of a predefined threshold. Maintenance measures are taken if an overrun takes place. This change in the potential difference may trigger a maintenance measure.

This method is suitable for monitoring measuring probes with immobilized reference electrolytes thickened by a polymer. By contrast, in liquid reference electrolytes a development of a continuous depletion progressing from the junction does not occur. Rather, in measuring probes having liquid reference electrolytes, the entire volume of the reference electrolyte is depleted due to mixing and diffusion. In addition, although the secondary reference element of the measuring probe described in EP 1 176 419 A2, which serves for monitoring, is separated by a junction from the continuously depleting reference electrolyte, ions in turn emerge through this diaphragm into the depleted reference electrolyte of the reference electrode. Thus, the secondary reference element also becomes depleted and does not constitute a stable reference.

DE 10 2011 086591 describes an approach by means of which a potentiometric measuring probe can be operated over long periods of time without maintenance measures, in particular without calibration or adjustment, in that the liquid contact with the measurement medium is essentially interrupted and is only temporarily established during the measurement by means of a switchable junction. It is true that this procedure fundamentally achieves the goal of prolonged, maintenance-free operation of the measuring probe. However, the integration of such a switchable junction into an outer wall of the probe housing is structurally complicated, in particular if a sensor design suitable for applications with high hygiene requirements is to be achieved. A switchable junction which is in contact with the measurement medium is moreover susceptible to defects caused by aggressive measuring media, measuring media with high pollution load, or mechanical stresses.

SUMMARY

It is therefore the object of the present disclosure to specify a measuring probe, and an electrochemical sensor with such a measuring probe, which may be operated maintenance-free over long periods of time, and which do not have the described disadvantages of the prior art.

This object is achieved according to the present disclosure by a measuring probe according to claim 1 and an electrochemical sensor according to claim 5. The present disclosure moreover encompasses a method for operating the electrochemical sensor according to claim 14 according to the present disclosure. Advantageous embodiments are listed in the dependent claims.

The measuring probe according to the present disclosure comprises a probe housing, a first cavity formed in the probe housing, a first electrolyte accommodated in the first cavity, a first electrode that is arranged inside the first cavity and contacts the first electrolyte, a first junction, arranged in a wall of the probe housing defining the first cavity, said junction at least temporarily connecting the first cavity with an environment of the measuring probe in such a way that a current flow between the first electrolyte and a medium surrounding the measuring probe, said current flow being mediated via ions as charge carriers, is possible via the junction. Such a probe housing further comprises a second cavity formed in the probe housing, a second electrolyte accommodated in the second cavity, a second electrode that is arranged inside the second cavity and contacts the second electrolyte, and a second junction which can be switched back and forth between an open and a closed state, the second junction in the closed state separating the first cavity and the second cavity from each other, and in the opened state connecting the second cavity to the first cavity in such a way that a current flow between the first electrolyte and the second electrolyte, mediated via ions as charge carriers, is possible via the second junction.

As described further below, the second electrode may serve to monitor a state of the measuring probe in that the second junction is in each case switched into the open state for a short time and a voltage is detected between the first and the second electrode. On the basis of this voltage, a depletion of the first electrolyte in the region of the first electrode can be concluded. Since the second junction may remain in the closed state over long periods of operation of the measuring probe, the potential which can be tapped at the second electrode remains constant over a period of time that may be longer, by orders of magnitude, than the time period in which the potential that can be tapped at the first electrode remains stable, which first electrode is constantly in contact via the first junction with first electrolytes in contact with the measurement medium, at least in measuring operation of the measuring probe, for example, as a reference electrode in a potentiometric, amperometric or voltammetric measurement.

In addition, the controllable second junction is not directly exposed to the measurement medium, but rather is protected and shielded by the surrounding first electrolyte and the first junction with respect to aggressive measuring media or measuring media tainted with a contaminant load. The second junction is also protected in this way against fouling by microorganisms or mechanical damage. In that the second junction is not directly designed for contact with the measurement medium, the structural design of the junction is also not limited by requirements of the process in which the measurement medium to be monitored with the sensor accumulates, for example, by hygiene requirements, or requirements relating to a chemical or mechanical stability of the junction.

The second junction may comprise a controllable valve, in particular in MEMS technology; a controllable gap; a controllable diaphragm; or a controllable nozzle.

In one possible embodiment, the second junction may be closed in a ground state, particularly in a no-current or no-voltage state (normally closed), and can be switched into the open state by activation by means of a control circuit, in particular by applying a current or a voltage.

Alternatively, the second junction may be open in a ground state, particularly in a no-current or no-voltage state (normally open), and can be switched into the closed state by activation by means of the control circuit, in particular by applying a current or a voltage.

In a further alternative embodiment, the second junction may be switched back and forth between at least two stable states, wherein only the switching process requires energy. For example, a first state may be a closed state of the junction, and a second state may be a fully or partially open state of the junction.

In one embodiment of the measuring probe, the second junction may be arranged in a wall of the probe housing that bounds the second cavity.

In principle, it is also possible for the first junction to also be set up to be switched back and forth between an open and a closed state. The service life of the measuring probe can thus be extended even further.

An electrochemical sensor having a measuring probe according to any of the embodiments described here further comprises a sensor circuit that is electrically conductively connected to the first and second electrodes, and that is set up to control the second junction in order to switch it into the open or closed state.

For this purpose, the sensor circuit may comprise, for example, a circuit part serving as a control circuit for controlling the first junction and/or an operating program executable by the sensor circuit, which operating program serves to control the second junction.

The sensor circuit may be further configured to switch the second junction into the open state and, while the second junction is in the open state, to determine a potential difference between the first and second electrode. As mentioned, this potential difference may serve to monitor the state of the measuring probe.

The sensor circuit can therefore be configured to leave the second junction in the closed state during a predetermined period of time, and to switch the junction into the open state after the predetermined time period elapses, and to determine a potential difference between the first and second electrode while the second junction is in the open state. The sensor circuit may further be designed to switch the junction back into the closed state after determining a measurement value of the potential difference between the first and second electrode. With increasing depletion of the first electrolyte, as described in the preamble, a drift of the potential detectable at the first electrode results. Since the second junction may remain closed for long, predetermined periods of time, the second electrolyte depletes orders of magnitude more slowly than the first electrolyte, so that the potential of the second electrode forms a stable reference for detecting the drift of the potential of the first electrode. The potential difference detected between the first and the second electrode may therefore serve for calibration and/or adjustment of the electrochemical sensor.

The length of the predetermined period of time, also referred to as the validation interval, may be provided as a fixed value to the sensor circuit. Alternatively, the sensor circuit may be configured to itself predetermine and/or adapt the length of the predetermined time interval. For example, the sensor circuit may be configured to adjust the time period as a function of sensor-specific or measurement point-specific parameters. Relevant sensor-specific parameters may be, for example, the operating duration of the sensor; the type of sensor; the measurand to be detected; or a load history, e.g. a temperature history or a history of cleaning and sterilization treatments carried out with the sensor, or the history of the validation measurements performed. Here, the measurement of the potential difference between the first and the second electrode with an open second junction is referred to as a validation measurement. Measurement-point-specific parameters may, for example, be values which reflect the average load of the sensor at the measurement point; average and/or maximum prevailing pH values, and reflect temperatures at the measurement point, mechanical loads of the sensor at the measurement point, a depletion rate of sensors of the same type at the measurement point, or the frequency of CIP (cleaning-in-place) or SIP (sterilization-in-place) methods performed at the measurement point.

In a further embodiment, in addition or as an alternative to the detection of the potential difference between the first and the second electrode after expiration of a predetermined time period in which the second junction remains in the closed state, the sensor circuit may be configured to switch the second junction into the open state as controlled by events, and to determine a potential difference between the first and the second electrode in the state in which the second junction is open. Possible triggering events are, for example, particular temperature loads or cleaning, sterilization or autoclaving processes to which the sensor is exposed. The time period between two such validation measurements, also referred to as a validation interval, is thus variable in this embodiment.

The electrochemical sensor may be a potentiometric sensor, for example. The sensor may have a measuring electrode, wherein the sensor circuit is configured to detect a potential difference between the first electrode and the measuring electrode, and to generate a measurement signal dependent on the potential difference. The measuring electrode may be a component of the measuring probe, for example. For example, this is the case given potentiometric combination electrodes.

The measuring electrode can be, for example, a metal electrode or an ion-selective electrode, in particular a pH electrode, or may comprise an ion-selective field-effect transistor.

The electrochemical sensor may also be an amperometric or voltammetric sensor. In this instance, the sensor may have a working electrode and a counter-electrode, wherein the sensor circuit comprises a regulating circuit, for example, a potentiostatic regulating circuit, which is connected to the working electrode, the counter-electrode and the first electrode, which regulating circuit is designed to generate a measurement signal which represents a current flowing between the working electrode and the counter-electrode given a predetermined voltage applied between the first electrode and the working electrode.

The sensor circuit may comprise a data processing device, for example, one or more microprocessors and memories in which data, parameters and an operating software are stored. The operating software of the sensor circuit comprises one or more algorithms which serve for the determination of measurement values from the measurement signals; for the monitoring, calibration and adjustment of the sensor according to the operating method described here and hereinafter; for the control of the second junction, and for the realization of other functions of the sensor, and which can be executed by the data processing device.

The sensor circuit can be completely accommodated in the probe housing. In another embodiment, however, it may also be accommodated completely or partly in a housing set apart from the probe housing. For example, the sensor circuit may have a probe circuit arranged within the probe housing, and a superordinate circuit arranged outside of the probe housing, in particular set apart from the measuring probe, wherein the superordinate circuit is connected to the probe circuit in a wired or wireless manner for communication. The superordinate circuit may, for example, be a component of a measuring transducer, of an (in particular portable) operating device, or of a process control.

As already mentioned, the sensor circuit may be set up to determine a measured value of a measurand, for example, a pH value, on the basis of the measurement signal. For example, the sensor circuit may be configured to digitize the measurement signal and to calculate—from the digital measurement signal using a calibration function, e.g. a calibration line—and output a measurement value of the measurand in the unit of the measurand. The calibration function may be stored in a memory of the sensor circuit. If the sensor circuit is divided up into a probe circuit permanently connected to the measuring probe and a superordinate circuit remote therefrom, the probe circuit may be configured to convert the measurement signal into a digital measurement signal and to output it to the superordinate circuit. The superordinate circuit may be configured to receive the digital measurement signal and, using the calibration function, to calculate the measured value of the measurand from the digital measurement signal and, for example, to output said measurement value via a display. The calculation of the measured value using the calibration function may alternatively also be performed by the probe circuit.

The sensor circuit may be further configured to use a correction value in the determination of the measurement value, which correction value is defined using a measurement of the potential difference between the first and the second electrode. This represents a self-adjustment of the sensor, since it can be assumed in a good approximation that the deviation of the measured value, determined by the sensor from the measurement signal by means of the calibration function, from the actually correct measured value is essentially determined by the drift of the reference potential which can be tapped at the first electrode. The correction value can be used to adapt the mentioned calibration function, for example. In this instance, the self-adjustment thus takes place purely by adapting a software program of the sensor circuit. It is alternatively also possible for the detected potential difference to be used to adapt circuit parameters of the sensor circuit, e.g. a zero point or a reference voltage of an operational amplifier, in order to already take into account the correction value in the detection or during the processing of the measurement signal, up to and including the digitization of the measurement signal.

A method for operating an electrochemical sensor according to any one of the embodiments described herein includes the steps of switching the second junction from the closed state into the open state, detecting a potential difference between the first and second electrodes, and switching the second junction from the open state into the closed state after detecting the potential difference.

As already described above, these method steps may be performed at regular time intervals, so-called validation intervals, or as controlled by events.

The method may further include determining a state of the electrochemical sensor based on the detected potential difference. The more strongly the first electrolyte is depleted, the greater the initial potential difference that can be detected between the first electrode and the second electrode.

Only when the second electrolyte is also depleted does the potential detectable at the second electrode also drift. This manifests itself in a decrease of the potential difference between the first and the second electrodes. The determination of the state of the electrochemical sensor may therefore include the comparison of a potential difference, detected at a first point in time, with at least one potential difference between the first and the second electrodes that was detected at a second point in time preceding the first point in time. In this way, a curve of the potential difference between the first and the second electrodes can be determined. It is possible to store the values of the potential difference between the first and second electrodes, said values being detected at a plurality of points in time in chronological succession, in order to thus record and evaluate individual segments of the curve of the potential difference, or even the entire curve of the potential difference, for diagnostic purposes.

The method may further include calibrating and/or adjusting the electrochemical sensor using the detected potential difference. In the present instance, the deviation is represented by the voltage detected between the first and the second electrodes. As already mentioned, the detected potential difference may be accounted for purely mathematically in the determination of the measured value from the measurement signal, for example, as a correction term. Alternatively, the adjustment may be performed by adapting circuit parameters based on the detected potential difference.

All described method steps, including the calibration and/or adjustment of the electrochemical sensor, may be performed by the sensor circuit, i.e. independently in the form of self-adjustment or self-calibration.

The determined state of the sensor may be used to adapt validation intervals, and/or to generate a maintenance recommendation.

The steps of switching the second junction from the closed state into the open state, of detecting the potential difference between the first and the second electrodes, and of detecting the potential difference form a validation measurement. During operation of the sensor, after expiration of a predetermined length of time a validation measurement may in each case be performed, wherein the length of the predetermined period of time may be established based on the determined state of the sensor. The determination of the predetermined time period based on the determined state may also be performed by the sensor circuit.

BRIEF DESCRIPTION OF THE DRAWINGS

In the following, the present disclosure is described in more detail with reference to the exemplary embodiments shown in the figures. The figures show.

DETAILED DESCRIPTION

Figure 1:
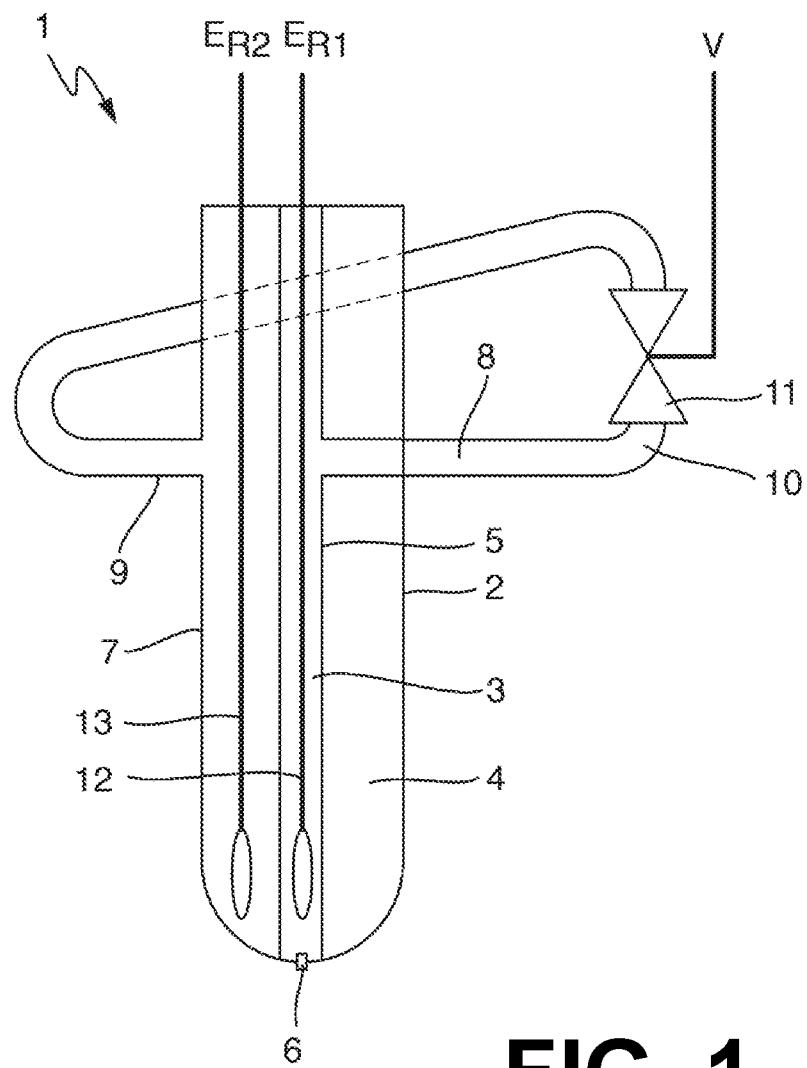
FIG. 1 shows a longitudinal cross-section of a reference electrode with switchable monitoring.

An essentially cylindrical reference electrode 1 is schematically depicted in longitudinal cross-section in FIG. 1. The reference electrode 1 may be designed as a measuring probe intended for immersion in a measurement fluid, and comprises a probe housing 2 which, in the present example, is formed from an electrically insulating material. The probe housing 2 may, however, also have electrically conductive components. A first cavity 3 and a second cavity 4 are formed in the probe housing 2. The probe housing 2 may be made of glass or plastic, for example.

The first cavity 3 is surrounded by a tubular wall 5 which has a first junction 6 at a front face end. In the present example, the junction 6 can be formed as, for example, a diaphragm made of a porous solid, e.g. a ceramic or plastic, which diaphragm is sealed into the wall 5.

The second cavity 4 is formed as an annular space between the tubular wall 5 and a tubular wall 7 of the probe housing 2, said tubular wall 7 being arranged coaxially to said tubular wall 5. At the front end of the measuring probe, which comprises the first junction 6 and is intended for immersion into the measurement fluid, the outer wall 7 and the tubular wall 5 are connected, for example materially bonded, fluid-tight with one another.

A first connection 8 opens into the first cavity 3 and is connected via a fluid line 10 to a second connection 9 which opens into the second cavity 4. Arranged in the fluid line 10 is a second junction 11, in FIG. 1 designed in the form of a valve. The fluid line 10 may be a flexible hose, and the valve may be a constriction hose valve, for example. The valve, and thus the junction 11, may be switched back and forth between an open and a closed state. Depending on whether the valve is in the open or closed state, the fluid line 10 establishes a fluidic connection between the first cavity 3 and the second cavity 4, or separates the first cavity 3 from the second cavity 4. The junction 11 is in contact with a control circuit (not shown) that is configured to control the junction 11. For this, the valve forming the junction 11 may, for example, be designed as a (normally closed) valve that is closed in the no-current or no-voltage state. In order to switch the junction 11 into the open state, the control circuit can correspondingly apply a voltage V to the valve.

The first cavity 3 is filled with a first electrolyte having a high concentration of a halide ion, chloride in the present example. The chloride concentration may typically be 3 mol/L. The electrolyte may be thickened or immobilized by means of a polymer. Arranged in the first cavity 3 is a first electrode 12 which contacts the first electrolyte, which first electrode 12 can be designed, for example, as silver wire coated at least in segments with a silver salt of the halide, silver chloride in the present example. With the electrolyte, which can be brought into electrolytic contact with a measurement medium via the first junction 6, the first electrode 12 forms a silver/silver chloride reference electrode.

The second cavity 4 is filled with a second electrolyte which preferably has a composition identical to the first electrolyte. Arranged in the second cavity 4 is a second electrode 13, preferably designed identical to the first electrode 12, which contacts the second electrolyte.

The fluid line 10 is also filled with an electrolyte which may have a composition identical to the first and second electrolyte. By switching the junction 11 into the open state, an electrolytic or a liquid/liquid contact is thus established between the first and the second electrolytes. This allows an ion-mediated current flow between the first electrolyte and the second electrolyte, and correspondingly between the first electrode 12 and the second electrode 13.

The measuring probe shown in FIG. 1 may serve as a reference electrode in a potentiometric, amperometric or voltammetric measurement. A reference potential ER1 may be tapped at the first electrode 12 for the potentiometric, amperometric or voltammetric measurement. The second junction 11 remains in the closed state during this measurement operation. In the course of operation of the measuring probe, the reference potential ER1 detected at the first electrode 12 varies due to the depletion of chloride ions in the first electrolyte, which chloride ions escape into the measurement fluid via the junction 6.

To check how strongly the reference potential $E_{R1}$ has already drifted at a particular point in time, a validation measurement may be performed by means of the second electrode 13, at which a control potential $E_{R2}$ can be tapped. The second junction 11 is hereby switched into the open state and, given an open second junction 11, a potential difference $U_J$, defined as:

$$U_J = E_{R1} - E_{R2},$$

is detected between the first electrode 12 and the second electrode 13, this being a measure of the difference of the chloride concentrations in the first and second electrolytes. Since the second junction 11 remains in the closed state during normal measurement operation of the reference electrode 1, it may be assumed that the chloride concentration in the second electrolyte does not change appreciably over a long time period in the service life of the reference electrode 1. The potential difference $U_J$ is thus a factor for the drift of the reference potential $E_{R1}$ detected at the first electrode 12 for potentiometric, amperometric or voltammetric measurement. A reference potential, defined as:

$$E_{R1}^* = E_{R1} + U_J,$$

detected at the first electrode 12 and corrected by means of the detected potential different $U_J$ may accordingly be used in the determination of the measurement value of the potentiometric, amperometric or voltammetric measurement. A self-calibration or self-adjustment of the measuring probe is possible in this way. An additional calibration, performed manually by a user, which includes the detection of measured calibration values by means of the measuring probe in one or more calibration media is therefore not necessary for the measuring probe shown in FIG. 1, or at least is necessary at markedly lengthened calibration intervals.

The potential difference $U_J$ between the first electrode 12 and the second electrode 13 may be detected recurrently over the operating duration of the measuring probe. The frequency of such validation measurements may be established by means of the process in which the measuring probe is used. In an application in water management, the drift of a conventional reference electrode is typically of the order of 0.1 mV/day, meaning that one validation measurement per day suffices in such an application. The second junction 11 is accordingly only in the open state for a few seconds per day. The second electrolyte therefore depletes more slowly than the first electrolyte, which is permanently in contact with the measuring liquid via the first junction 6, by orders of magnitude.

A state of the reference electrode 1 or of the measuring probe may be concluded from the currently measured value and/or using a curve of the potential difference $U_J$. The potential difference $U_J$ may also be used to determine and indicate a calibration quality of the measuring probe and/or a measurement error of the measured values detected by means of the measuring probe.

If the second electrolyte is also significantly depleted of chloride, the end of life of the measuring probe has typically been reached. This is noticeable in that the magnitude of the potential difference $U_J$ detected between the first electrode 12 and the second electrode 13 decreases again. The start of depletion of the second electrolyte 13 can therefore be established from a comparison of a currently detected value of the potential difference $U_J$ with a value of the potential difference $U_J$ detected at an earlier point in time, or from a time curve of the potential difference $U_J$.

Figure 2:
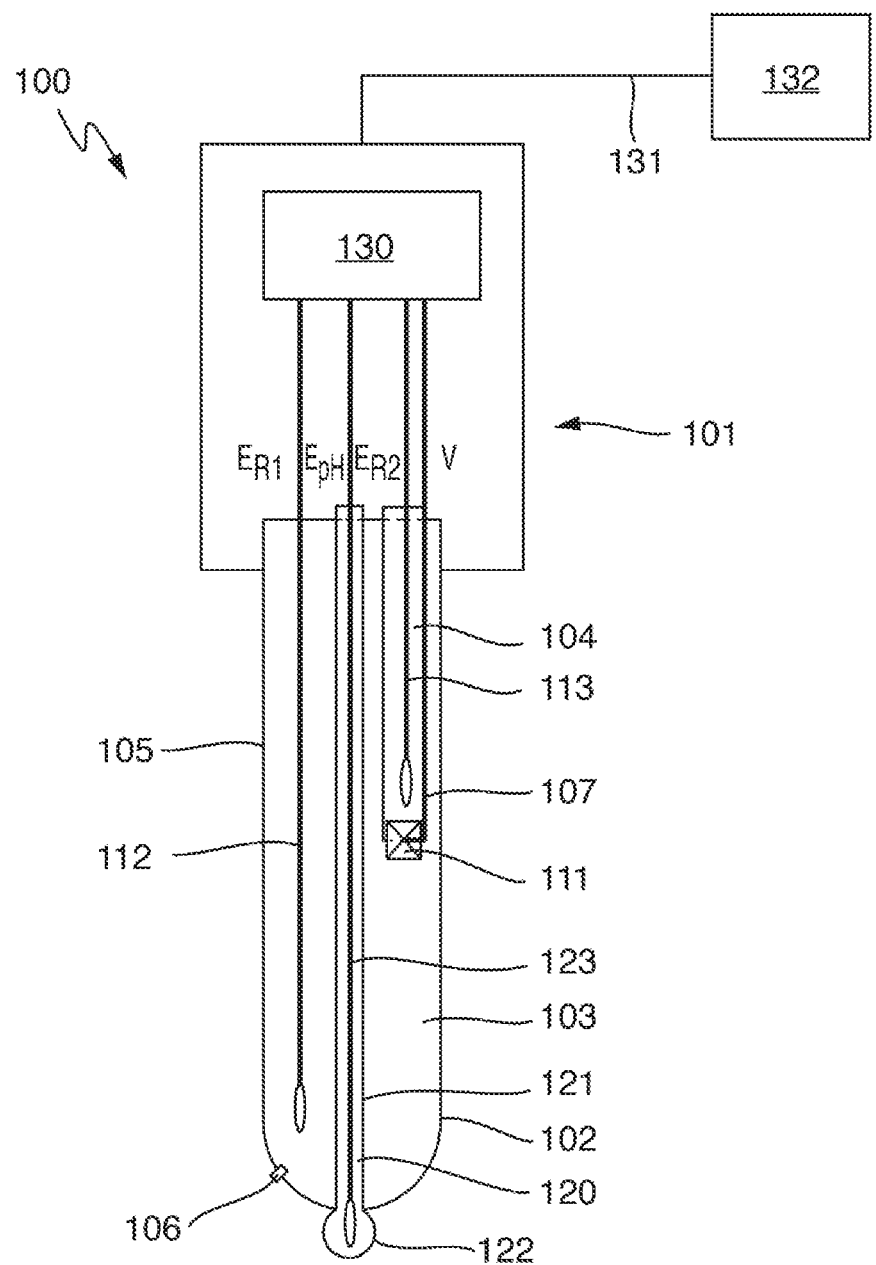
FIG. 2 shows a longitudinal cross-section of a pH sensor comprising a pH combination sensor with switchable monitoring of the reference electrode.

FIG. 2 schematically shows, in longitudinal cross-section, a potentiometric pH sensor 100 which comprises a measuring probe 101 which can be immersed in a measurement medium. The measuring probe 101 has a probe housing 102 in which three cavities are formed. A first cavity 103 is surrounded by an outer wall 105 in whose front region, intended for immersion in a measurement medium, is arranged a first junction 106 which is designed as a porous ceramic diaphragm in the present example. Projecting into the first cavity 103 is a tubular housing part 107 which includes a second cavity 104. At its front end region protruding into the first cavity 103, the housing part 107 has a second junction 111 which is designed to be switched back and forth between an open and a closed state. The probe housing 102 comprises an additional tubular housing portion 121 arranged coaxially with the outer wall 105 and within the first cavity 103. At its front end intended for immersion in the measurement medium, the tubular housing part 121 is sealed with a pH glass membrane 122 provided for contact with the measurement medium and for enclosing a third cavity 120.

A measuring electrode of the potentiometric sensor 100 is formed in the third cavity 120. The third cavity 120 is filled with a pH buffer solution comprising a high halide ion concentration, in the present example a chloride concentration of 3 mol/L, and the pH glass membrane 122 wetted on its back side. The buffer solution may be thickened by means of a polymer. In the third cavity 120, a discharge electrode 123 is arranged that is designed as a silver wire coated with silver chloride in the present example. If the glass membrane 122 is contacting the medium, a potential $E_{pH}$ that depends on the pH value of the measurement medium can be tapped at the discharge electrode.

The first cavity 103 is filled with a first electrolyte containing a high concentration of halide ions, preferably the same halide ion concentration as the pH buffer solution of the measuring electrode. In the present example, this is a 3 molar KCl solution. Moreover, arranged in the first cavity 103 is a first electrode 112 that likewise is ideally designed identical to the discharge electrode 123 of the measuring electrode, which first electrode 112 contacts the first electrolyte. If the front end of the measuring probe, including the glass membrane 122 and the first junction 106, is in contact with the measurement medium, a reference potential $E_{R1}$ for the potentiometric pH measurement can be detected at the first electrode.

The second cavity 104 is filled with a second electrolyte which preferably has the same composition as the first electrolyte. Arranged in the second cavity 104 is a second electrode 113 contacting the second electrolyte, which second electrode is designed identical to the first electrode 112. At the second electrode, a control potential $E_{R2}$ can be tapped when the second junction 111 is in the open state.

The first electrode 112, the second electrode 113, and the discharge electrode 123 are electrically conductively led through from the first, second, and third cavities and connected with a probe circuit 130. The probe circuit 130 is additionally connected to the second junction 111 via an electrical line. The probe circuit 130 is accommodated in the probe housing 102 in an electronics space that is separated liquid-tight from the first, second, and third cavities 103, 104, 120. The probe circuit 130 is connected to a superordinate circuit 132 via a connecting line 131. The superordinate circuit 132 may be a part of a measuring transducer or of a process control device, for example. The probe circuit 130 and the superordinate circuit 132 together form a sensor circuit which serves for detecting measured values by means of the sensor 100, for validation, for state diagnosis, and/or for self-calibration or self-adjustment of the sensor 100.

The detection of measurement values of the pH value of a measurement medium wetting the measuring probe 101 at its front end region takes place in a manner known per se. For this purpose, the probe circuit 130 is designed to measure a measurement potential difference $U_{pH}$, where $$U_{pH} = E_{pH} - E_{R1},$$

between the discharge electrode 123 and the first electrode 112. This is a measure of the pH value of the measurement medium. In the present example, the probe circuit 130 is designed to generate a measurement signal representing the measurement potential difference $U_{pH}$, to digitize said measurement signal, and to output said measurement signal to the superordinate circuit 132 as a digital measurement signal. The superordinate circuit 132 may include a microprocessor and one or more memories in which are stored one or more operating programs that can be executed by the microprocessor. The operating programs serve different functionalities of the superordinate circuit 132, in particular measurement value determination. To determine the measured value, the superordinate circuit 132 performs the following method steps with execution of the corresponding operating programs. First, the superordinate circuit 132 detects the measurement signal obtained from the probe circuit 130 and calculates from this the measured value, here the pH value, as a function value of a calibration function stored in a memory of the superordinate circuit 132. The calibration function may be a calibration line, for example, since the pH value depends linearly, over a wide range with good approximation, on the potential difference detectable between the first electrode 112 and the discharge electrode 123. The measured value thus determined may be output by the superordinate circuit 132, for example, via an interface, to a further data processing device, to an operating device, or via a display.

As described in the preamble, a major error source in the sensor 100 shown in FIG. 2 is the depletion of the electrolyte, which leads to a drift of the reference potential $E_{R1}$. This drift may be monitored by means of the second electrode 113. This takes place in a very analogous manner, as was described above, to using the measuring probe shown in FIG. 1. For this, the probe circuit 130 switches the second junction 111 into an open state, for instance, by applying a voltage V. While the junction 111 is in the open state, the probe circuit 130 detects a potential difference, $$U_J = E_{R1} - E_{R1},$$

between the first electrode 112 and the second electrode 113. The potential difference $U_J$ reflects the drift of the reference potential $E_{R1}$. Thus, it may on the one hand serve for determining a current state of the reference electrode of the potentiometric sensor 100, very analogously as described further above for the measuring probe according to FIG. 1. The probe circuit 130 may therefore further process the measured value of the potential difference for diagnostic purposes. It may additionally store the measured value in a memory in order thus to record a curve of values of the potential difference $U_J$ measured successively at time intervals over the operating duration of the sensor 100, and to use it for diagnostic purposes and/or for determining a remaining service life of the sensor 100.

After detecting the potential difference $U_J$, the probe circuit 130 switches the second junction 111 to the closed state again.

The probe circuit 130 may comprise an operating program stored in a memory of the probe circuit 130, which operating program includes an algorithm which includes these method steps and can be executed by the probe circuit 130. The probe circuitry may moreover be configured to recurrently determine in this way a value of the potential difference $U_J$, for example, at regular time intervals. The validation interval between two measurements of the potential difference $U_J$ may, as already mentioned, be of the order of one day in applications in water management. The validation interval may also be adjustable by the probe circuit 130 as a function of sensor-specific or measurement-point-specific parameters. The validation interval may also be adaptable using the results of validation measurements.

A currently detected value of the potential difference $U_J$ may also be used for calibrating and/or adjusting the sensor 100. In this instance, the probe circuit 130 or the superordinate circuit 132 may be configured to perform the calibration and/or adjustment completely automatically, without the intervention of an operator. For this purpose, the probe circuit 130 or the superordinate circuit 132 may execute a calibration and/or adjustment program, for example, which includes the following:

In a first step, a current value of the potential difference $U_J$ may be determined in the manner described in the preceding. This value may serve as a correction value for an adjustment of the sensor, in that in future measurements (e.g., meaning measurements performed after the detection of the current value of the potential difference $U_J$) the reference potential detected at the first electrode 112, and thus the measured potential difference $U_{pH}$, is corrected with potential difference $U_J$ according to:

$$U_{pH} = E_{pH} - (E_{R1} + U_J).$$

This correction may be carried out purely computationally, for example, in that the calibration line is taken into account as a correction term for the function argument in order to calculate a pH value from $U_{pH}$. Alternatively, however, the probe circuit 130 may also alter a parameter of the circuit part serving for measurement of the measurement potential difference $U_{pH}$, for example, in that it changes a zero point or a reference voltage of an amplifier.

The adjustment described herein may be triggered manually by an input of an operator into the superordinate circuit 132. Alternatively, however, the adjustment may also be performed completely automatically by the probe circuit 130 and/or the superordinate circuit 132. Regular calibrations performed by an operator are thus dispensed with, so that the sensor may be operated over long periods of time without maintenance.

Reference electrodes of other potentiometric sensors, for example, ISE sensors or ISFET sensors, or even amperometric or voltammetric sensors, may be designed in a very analogous way, in order to thus enable a continuous monitoring of the reference electrode and a regular self-calibration and self-adjustment of the sensors.

The invention claimed is:

1. A measuring probe for electrochemical measurements, comprising:
   a probe housing including a first cavity and a second cavity defined therein;
   a first electrolyte disposed in the first cavity;
   a first electrode extending into the first cavity and in contact with the first electrolyte, wherein the first electrode comprises a silver element coated at least partially with a silver salt of a halide ion contained in the first electrolyte, the silver element in direct contact with the first electrolyte;
   a first junction disposed in a wall of the probe housing defining the first cavity, the first junction at least temporarily enabling electrolytic communication between the first cavity and an environment of the measuring probe, thereby enabling a first current flow between the first electrolyte and a medium surrounding the measuring probe via the first junction, the first current flow being mediated via ions as charge carriers;
   a second electrolyte disposed in the second cavity;
   a second electrode extending into the second cavity and in contact with the second electrolyte;
   a second junction having reversible open and closed states,
   wherein in the closed state the second junction separates the first cavity from the second cavity, and in the open state the second junction connects the second cavity to the first cavity in direct electrolytic contact such that a second current flow is enabled between the first electrolyte and the second electrolyte via the second junction, the second current flow being mediated via ions as charge carriers;
   a measuring electrode; and
   a sensor circuit electrically connected to the first electrode, the second electrode and the measuring electrode, wherein the sensor circuit is configured to:
      detect a potential difference between the first electrode and the measuring electrode;
      generate a measurement signal dependent on the potential difference;
      control the second junction to switch between the open or closed states; and
      determine a potential difference between the first electrode and the second electrode when the second junction is in the open state.

2. The measuring probe of claim 1, wherein the second junction comprises a controllable valve.

3. The measuring probe of claim 2, wherein the controllable valve is a microelectromechanical (MEMS) device, a controllable gap, a controllable diaphragm or a controllable nozzle.

4. The measuring probe of claim 1, wherein, in the closed state, the second junction is in a no-current or no-voltage state, and wherein the second junction is switched to the open state by applying a current or a voltage using a control circuit.

5. The measuring probe of claim 1, wherein the second junction is disposed in a wall of the probe housing that defines the second cavity.

6. An electrochemical sensor comprising:
a measurement probe including:
a probe housing including a first cavity and a second cavity defined therein;
a first electrolyte disposed in the first cavity;
a first electrode extending into the first cavity and in contact with the first electrolyte, wherein the first electrode comprises a silver element coated at least partially with a silver salt of a halide ion contained in the first electrolyte, the silver element in direct contact with the first electrolyte;
a first junction disposed in a wall of the probe housing defining the first cavity, the first junction at least temporarily enabling electrolytic communication between the first cavity and an environment of the measuring probe, thereby enabling a first current flow between the first electrolyte and a medium surrounding the measuring probe via the first junction, the first current flow being mediated via ions as charge carriers;
a second electrolyte disposed in the second cavity;
a second electrode extending into the second cavity and in contact with the second electrolyte; and
a second junction having reversible open and closed states,
wherein in the closed state the second junction separates the first cavity from the second cavity, and in the open state the second junction connects the second cavity to the first cavity in direct electrolytic contact such that a second current flow is enabled between the first electrolyte and the second electrolyte via the second junction, the second current flow being mediated via ions as charge carriers;
a measuring electrode; and
a sensor circuit electrically conductively connected to the first electrode and the second electrode, the sensor circuit configured to:
control the second junction to switch between the open or closed states;
detect a potential difference between the first electrode and the measuring electrode;
generate a measurement signal dependent on the potential difference; and
determine a potential difference between the first electrode and the second electrode when the second junction is in the open state.

7. The electrochemical sensor of claim 6, wherein the sensor circuit is further configured to leave the second junction in the closed state for a predetermined time period and to switch the junction into the open state after expiration of the predetermined time period.

8. The electrochemical sensor of claim 6, wherein the measuring electrode includes a metal electrode, an ion-selective electrode, or ion-selective field-effect transistor.

9. The electrochemical sensor of claim 6, wherein the sensor circuit includes a probe circuit disposed within the probe housing and a superordinate circuit disposed outside of the probe housing, wherein the superordinate circuit is connected to the probe circuit as to enable either wired or wireless communication.

10. The electrochemical sensor of claim 6, wherein the sensor circuit is further configured to determine a measured value of a measurand based on the measurement signal.

11. The electrochemical sensor of claim 10, wherein the sensor circuit is further configured to use a correction value in the determination of the measured value, the correction value based on a measurement of the potential difference between the first and the second electrode.

12. A method of operating an electrochemical sensor, the method comprising:
providing a measurement probe, the measuring probe including:
a probe housing including a first cavity and a second cavity defined therein;
a first electrolyte disposed in the first cavity;
a first electrode extending into the first cavity and in contact with the first electrolyte;
a first junction, disposed in a wall of the probe housing defining the first cavity, the first junction at least temporarily enabling electrolytic communication between the first cavity and an environment of the measuring probe, thereby enabling a first current flow between the first electrolyte and a medium surrounding the measuring probe via the first junction, the first current flow being mediated via ions as charge carriers;
a second electrolyte disposed in the second cavity;
a second electrode extending into the second cavity and in contact with the second electrolyte; and
a second junction having reversible open and closed states,
wherein in the closed state the second junction separates the first cavity from the second cavity, and in the open state the second junction connects the second cavity to the first cavity in direct electrolytic contact such that a second current flow is enabled between the first electrolyte and the second electrolyte via the second junction, the second current flow being mediated via ions as charge carriers; and
a sensor circuit electrically conductively connected to the first electrode and the second electrode, the sensor circuit configured to control the second junction to switch between the open or closed states;
switching the second junction from the closed state to the open state;
detecting a potential difference between the first and second electrode; and
switching of the second junction from the open state to the closed state after detecting the potential difference.

13. The method of claim 12, further comprising determining a state of the electrochemical sensor based on the detected potential difference.

14. The method of claim 13, wherein the determining of the state of the electrochemical sensor includes comparing the potential difference detected at a first time with at least one potential difference detected at a second time, the second time preceding the first time.

15. The method of claim 13, further comprising calibrating and/or adjusting the electrochemical sensor using the detected potential difference.

16. The method of claim 15, wherein the calibration and/or adjustment of the electrochemical sensor is performed by the sensor circuit.

17. The method of claim 13, wherein the determined state of the sensor is used to adapt validation intervals and/or to generate a maintenance recommendation.

18. The method of claim 13, wherein the steps of switching the second junction from the closed state to the open state and detecting the potential difference between the first and the second electrode define a validation measurement, and wherein the validation measurement is performed after expiration of a predetermined time period of operation of the sensor, wherein the predetermined time period is established based on the determined state of the sensor.

19. The measuring probe of claim 1, wherein the sensor circuit is further configured to determine a measured value of a measurand based on the measurement signal.

20. The measuring probe of claim 1, wherein the measuring electrode includes a metal electrode, an ion-selective electrode or an ion-selective field effect transistor.

21. An electrochemical sensor, comprising:
a measuring probe including:
- a probe housing including a first cavity and a second cavity defined therein;
- a first electrolyte disposed in the first cavity;
- a first electrode extending into the first cavity and in contact with the first electrolyte, wherein the first electrode comprises a silver element coated at least partly with a silver salt of a halide ion contained in the first electrolyte, the silver element in direct contact with the first electrolyte;
- a first junction disposed in a wall of the probe housing defining the first cavity, the first junction at least temporarily enabling electrolytic communication between the first cavity and an environment of the measuring probe, thereby enabling a first current flow between the first electrolyte and a medium surrounding the measuring probe via the first junction, the first current flow being mediated via ions as charge carriers;
- a second electrolyte disposed in the second cavity;
- a second electrode extending into the second cavity and in contact with the second electrolyte;
- a second junction having reversible open and closed states,
wherein in the closed state the second junction separates the first cavity from the second cavity, and in the open state the second junction connects the second cavity to the first cavity in direct electrolytic contact such that a second current flow is enabled between the first electrolyte and the second electrolyte via the second junction, the second current flow being mediated via ions as charge carriers;
- a working electrode;
- a counter electrode; and
- a sensor circuit electrically connected to the first electrode, the second electrode, the working electrode and the counter electrode, wherein the sensor circuit includes a potentiostatic regulating circuit connected to the working electrode, the counter electrode and the first electrode, the regulating circuit configured to:
  - generate a measurement signal representing a current flowing between the working electrode and the counter electrode given a predetermined voltage applied between the first electrode and the working electrode;
  - control the second junction to switch between the open or closed states; and
  - determine a potential difference between the first and second electrodes when the second junction is in the open state.

* * * * *